United States Patent
Lin et al.

(10) Patent No.: US 9,437,158 B2
(45) Date of Patent: Sep. 6, 2016

(54) ELECTRONIC DEVICE FOR CONTROLLING MULTI-DISPLAY AND DISPLAY CONTROL METHOD THEREOF

(71) Applicants: Beijing Lenovo Software Ltd, Beijing (CN); Lenovo (Beijing) Co., Ltd., Beijing (CN)

(72) Inventors: Weizhi Lin, Beijing (CN); Chen Li, Beijing (CN); Yu Chen, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 308 days.

(21) Appl. No.: 13/845,799

(22) Filed: Mar. 18, 2013

(65) Prior Publication Data

US 2013/0241944 A1    Sep. 19, 2013

(30) Foreign Application Priority Data

Mar. 19, 2012 (CN) .......................... 2012 1 0073340
Mar. 26, 2012 (CN) .......................... 2012 1 0082777

(51) Int. Cl.
G06F 3/0484 (2013.01)
G06F 3/0488 (2013.01)
G06F 9/44 (2006.01)
G06F 3/14 (2006.01)
G09G 5/00 (2006.01)

(52) U.S. Cl.
CPC ............. *G09G 5/006* (2013.01); *G06F 3/0484* (2013.01); *G06F 3/04883* (2013.01); *G06F 3/1454* (2013.01); *G06F 9/4443* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 7,581,186 B2 | 8/2009 | Dowdy et al. | |
| 8,125,458 B2 | 2/2012 | Keam | |
| 8,493,414 B2 | 7/2013 | Matsunobu | |
| 2004/0046784 A1* | 3/2004 | Shen et al. | 345/733 |
| 2008/0066016 A1 | 3/2008 | Dowdy et al. | |
| 2008/0192059 A1* | 8/2008 | Kennedy | 345/537 |

(Continued)

FOREIGN PATENT DOCUMENTS

| | | |
|---|---|---|
| CN | 1584935 A | 2/2005 |
| CN | 101515226 A | 8/2009 |

(Continued)

OTHER PUBLICATIONS

Tandler et al, ConnecTables: Dynamic Coupling of Displays for the Flexible Creation of Shared Workspaces, 2001, ACM.*

(Continued)

*Primary Examiner* — Kee M Tung
*Assistant Examiner* — Xin Sheng
(74) *Attorney, Agent, or Firm* — Harness, Dickey & Pierce, P.L.C.

(57) ABSTRACT

A display control method for an electronic device and an electronic device are provided, which can implement interactive program display or interactive picture display, and thus provide good user experience. The method includes: a display unit receives a first operation and generates a first instruction corresponding to the first operation; a process unit responses the first instruction to control the display region, so that the first display region and the second display region perform interactive program display or interactive picture display.

8 Claims, 4 Drawing Sheets

(56) References Cited

U.S. PATENT DOCUMENTS

| | | |
|---|---|---|
| 2009/0085881 A1 | 4/2009 | Keam |
| 2010/0313143 A1 | 12/2010 | Jung et al. |
| 2011/0292081 A1 | 12/2011 | Matsunobu |

FOREIGN PATENT DOCUMENTS

| | | |
|---|---|---|
| CN | 101542479 A | 9/2009 |
| CN | 101770399 A | 7/2010 |
| CN | 101809880 A | 8/2010 |
| CN | 101923484 A | 12/2010 |
| CN | 101924675 A | 12/2010 |
| CN | 102331917 A | 1/2012 |
| CN | 102331951 A | 1/2012 |
| JP | 2006018348 A | 1/2006 |
| WO | WO 2008043587 A1 * | 4/2008 ............ G06F 3/048 |
| WO | WO-2011099803 A2 | 8/2011 |

OTHER PUBLICATIONS

Bonifazi et al, The Task Manager for the LHCb On-Line Farm, 2005.*

Reilly, The Single Java Object, 2006.*

First Chinese Office Action regarding Application No. 201210073340.8, dated Mar. 6, 2014.

Second Chinese Office Action regarding Application No. 201210073340.8, dated Oct. 28, 2014.

First Chinese Office Action regarding Application No. 201210082777.8, dated Feb. 8, 2014.

Second Chinese Office Action regarding Application No. 201210082777.8, dated Sep. 19, 2014.

\* cited by examiner

ELECTRONIC DEVICE FOR CONTROLLING MULTI-DISPLAY AND DISPLAY CONTROL METHOD THEREOF

CROSS-REFERENCE TO RELATED APPLICATIONS

The present application claims priority to Chinese Patent Application Nos. 201210073340.8, filed on Mar. 19, 2012, and 201210082777.8 filed Mar. 26, 2012 entitled "ELECTRONIC DEVICE AND DISPLAY CONTROL METHOD THEREOF", the entire disclosure of which is incorporated herein by reference.

FIELD OF THE INVENTION

The present invention relates to the field of electronic technique, and particularly to an electronic device and a display control method thereof.

BACKGROUND OF THE INVENTION

Electronic devices are used more and more widely. Generally, one touchable electronic device can be used by only one person at one time due to limitations of screen and application mode. For example, if a general tablet runs a game, only one player can operate the game. For some multiplayer games, the tablet runs only one application and it is required that the users select multiplayer mode at the beginning of the game. If someone wants to join the game, it is necessary to end and re-begin the game; the users cannot join the game at any time, and the user experience is not good.

Moreover, multi-window of the display screen enables multiple operations on the same screen, which brings convenience to the users and thus is popular. Nowadays, the usually-used display screens are touch display screens, which are referred to as "man-machine interfaces" in industry field. The touch display screen may display through a display screen and receive operation parameters and inputted operation instructions by an input unit, so as to implement the interaction between human and machine. The touch display screen is an industry device that incorporates information process, data communication and remote control. The touch display screen has advantages such as it is solid and durable, has fast reaction speed and saved space, and is easy to be interacted. By such technique, the users can operate the host by touching icons or words on the display screen by fingers, therefore, the man-machine interactions are simple. With increase of inquiry services, multi-window operations of display screens, particular touch screens, are increased, but there has no interactive operation thereof in the prior art.

SUMMARY OF THE INVENTION

A display control method for an electronic device and an electronic device are provided according to embodiments of the present invention, which can implement interactive program display and interactive picture display, and thus provide good user experience.

In order to achieve the above objects, following technical solutions are employed according to embodiments of the present invention.

It is provided a display control method for an electronic device, which is applied to the electronic device including a display unit and a process unit, a display region of the display unit includes at least a first display region and a second display region, the method includes: receiving a first operation and generating a first instruction corresponding to the first operation by the display unit; and responding the first instruction and controlling the display region by the process unit, so that the first display region and the second display region perform interactive program display or interactive picture display.

If the interactive program display is performed, a first operating system runs on the electronic device, the first display region and the second display region are a first operation and identification region and a second operation and identification region respectively, the first operation and identification region and the second operation and identification region are part of the display region and are adapted to promote a user to perform a touch operation on the operation and identification region, where before receiving the first operation by the display unit, the method further includes: displaying an interactive program interface of a first application in the first operation and identification region, where the first application runs based on the first operating system; and responding the first instruction and controlling the display region by the process unit, so that the first display region and the second display region perform the interactive program display includes: responding the first instruction and controlling a second application to run by the process unit, so that an interactive program interface of the second application is displayed in the second operation and identification region, the first application is the same as or is associated with the second application.

In a case that the second application is the same as the first application, a plurality of first applications are able to run on the first operating system simultaneously.

In a case that the second application is the same as the first application, a plurality of first applications are unable to run on the first operating system simultaneously, where responding the first instruction and controlling the second application to run by the process unit includes: starting a virtual machine unit and running the first application on the virtual machine unit; an operating system running on the virtual machine unit is the first operating system or a second operating system different from the first operating system.

The first application and the second application are sub-applications of a third application, and after responding the first instruction and controlling the second application to run by the process unit and displaying the interactive program interface of the second application in the second operation and identification region, the method further includes: displaying interactive information of the first application and the second application in a third operation and identification region of the display unit.

In a case that the second application is associated with the first application, the first application is a list application of a plurality of applications, and the second application is one of the plurality of applications.

If the interactive picture display is performed, the first display region and the second display region are a first display region and a second display region respectively, the first display region is adapted to display a first picture content, and the second display region is adapted to display a second picture content; where the first instruction is a calling command between the first display region and the second display region; and responding the first instruction and controlling the display region by the process unit, so that the first display region and the second display region perform the interactive picture display includes: transmitting the first picture content displayed in the first display region to the second display region; and controlling the second display region to display the first picture content.

The first display content is adapted to be controlled by a first user and the second display content is adapted to be controlled by a second user, where after receiving the calling command between the first display region and the second display region, the method further includes: transmitting the first picture content displayed in the first display region to the second display region, and at the same time transferring control power of the first display content from the first user to the second user.

Displaying the first picture content in the second display region includes: displaying the first picture content, and also the second picture content in the second display region.

Displaying the first picture content, and also the second picture content in the second display region includes: displaying the received first picture content in foreground of the second display region; and displaying the second picture content in background of the second display region.

After transferring control power of the first display content from the first user to the second user, the method further includes: switching the first display content and an application executing the display content to the second user.

It is further provided an electronic device, which includes a display unit and a process unit, where a display region of the display unit includes at least a first display region and a second display region; the display unit is adapted to receive a first operation and generate a first instruction corresponding to the first operation; and the process unit is adapted to response the first instruction and control the display region, so that the first display region and the second display region perform interactive program display or interactive picture display.

If the interactive program display is performed, a first operating system runs on the electronic device, the first display region and the second display region included in the display region are a first operation and identification region and a second operation and identification region respectively, the first operation and identification region and the second operation and identification region are part of the display region and are adapted to promote a user to perform a touch operation on the operation and identification region, the display unit is further adapted to display an interactive program interface of a first application in the first operation and identification region, where the first application runs based on the first operating system; and the process unit is further adapted to response the first instruction, control a second application to run, and instruct the display unit to display an interactive program interface of the second application in the second operation and identification region, where the first application is the same as or is associated with the second application.

In a case that the second application is the same as the first application, a plurality of first applications are able to run on a same operating system simultaneously.

In a case that the second application is the same as the first application, a plurality of first applications are unable to run on a same operating system simultaneously, and the device further includes a virtual machine unit; the process unit is further adapted to start the virtual machine unit; the virtual machine unit is adapted to run the first application after receiving a starting instruction from the process unit, where an operating system running on the virtual machine unit is the first operating system or a second operating system different from the first operating system.

The first application and the second application are sub-applications of a third application, and the display unit is further adapted to display interactive information of the first application and the second application in a third operation and identification region of the display unit.

The second application is associated with the first application, the first application is a list application of a plurality of applications, and the second application is one of the plurality of applications.

If the interactive picture display is performed, the first display region and the second display region included in the display region are a first display region and a second display region respectively, the first display region is adapted to display a first picture content, and the second display region is adapted to display a second picture content; the first instruction corresponding to the first operation generated by the display unit according to the received first operation is a calling command between the first display region and the second display region; the process unit is adapted to transmit the first picture content displayed in the first display region to the second display region, and control the second display region to display the first picture content.

The electronic device further includes: a transferring unit, adapted to transfer control power of the first display content from a first user to a second user.

The transferring unit is further adapted to transfer control power of the second display content from the second user to the first user.

The electronic device further includes: a switching unit, adapted to switch the first display content and an application executing the display content to a second user.

The switching unit is further adapted to switch the second display content and an application executing the display content to a first user.

For the interactive program display, while the first application is displayed in the first operation and identification region of the display unit, the electronic device may display the second application associated with the first application in other operation and identification region of the display unit. Therefore, the electronic device may display the second application in different operation and identification region as long as the user performs the first operation, which provides good user experience.

For the interactive picture display, if there are multiple windows, multiple users may interact with each other via the different windows. In this case, when receiving the calling command between the first display region and the second display region, the device transmits the first picture content displayed in the first display region to the second display region, and displays the first picture content and the second picture content in the second display region. Therefore, interactive operations among multiple windows are implemented and the user experience is improved.

BRIEF DESCRIPTION OF THE DRAWINGS

In order to illustrate technical solutions of the embodiments of the invention or the prior art more clearly, drawings to be used in descriptions of the embodiments or the prior art are introduced briefly hereinafter. Obviously, the drawings described below are only some embodiments of the invention, and those skilled in the art can obtain other drawings from these drawings without any creative work.

DETAILED DESCRIPTION OF THE INVENTION

Technical solutions of the embodiments of the invention will be described clearly and completely below in conjunction with the drawings of the embodiments of the invention. Obviously, the embodiments described are only some but not all of embodiments of the invention. All other embodiments obtained by those skilled in the art from the embodiments of the invention without any creative work fall within the protection scope of the invention.

Figure 1:
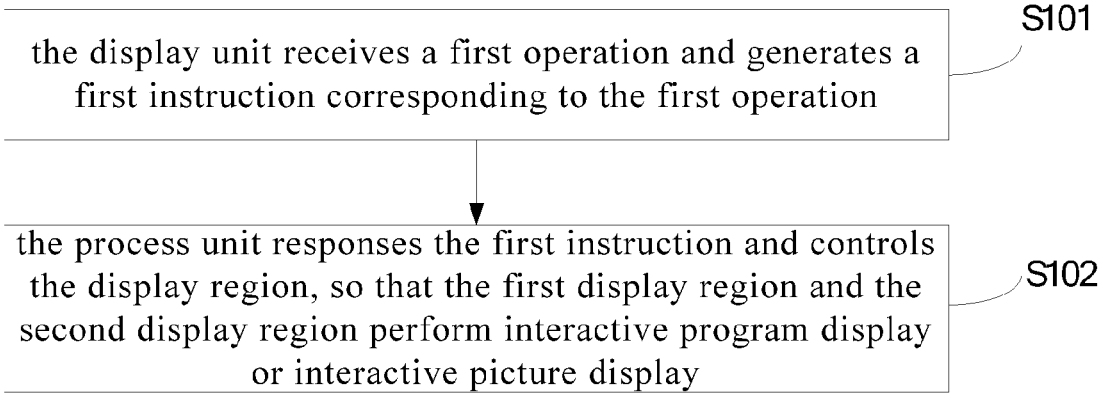
FIG. 1 is a flowchart of a display control method for an electronic device according to the present invention.

Referring to FIG. 1, a display control method for an electronic device is provided according to embodiments of the present invention. The method is applied to an electronic device including a display unit and a process unit, the display region of the display unit includes at least a first display region and a second display region. Specifically, the method includes the following steps:

S101, the display unit receives a first operation and generates a first instruction corresponding to the first operation; and S102, the process unit responses the first instruction and controls the display region, so that the first display region and the second display region perform interactive program display or interactive picture display.

Methods and devices for controlling the interactive program display and the interactive picture display will be described in details below.

The First Embodiment

Figure 2:
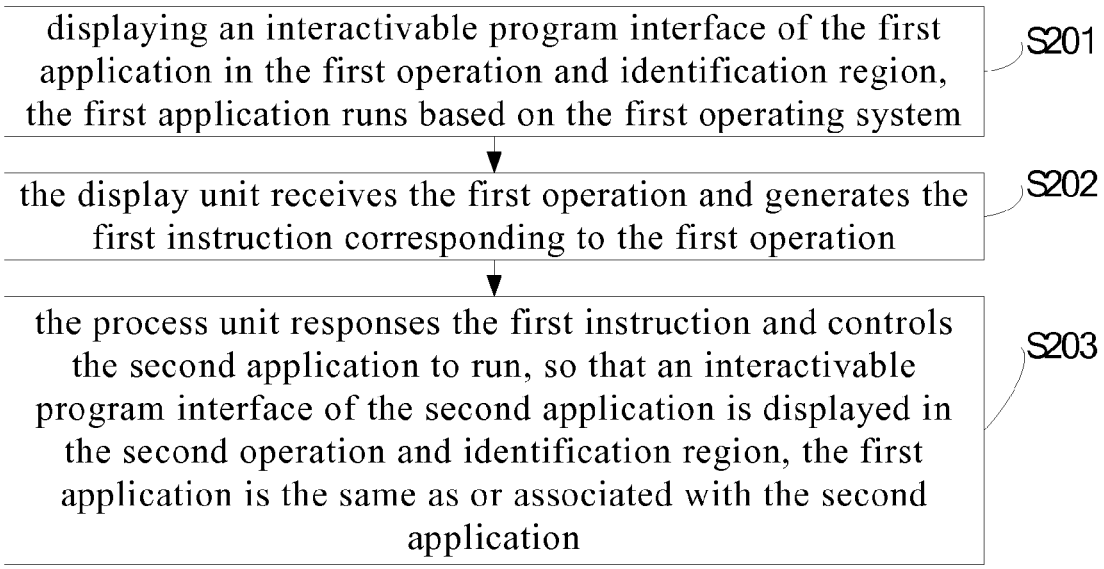
FIG. 2 is a flowchart of an interactive program display control method according to a first embodiment of the present invention.

A method for interactive program display control is provided according to an embodiment of the present invention. The method is applied to an electronic device, the electronic device includes a display unit and a process unit, a first operating system runs on the electronic device. Referring to FIG. 2, the information processing method includes:

S201, displaying an interactive program interface of a first application in a first operation and identification region, the first application runs based on the first operating system.

The display region of the display unit of the electronic device includes multiple operation and identification regions, each of the multiple operation and identification regions is a part of the display region and is adapted to promote a user to perform a touch operation on the operation and identification region. The multiple operation and identification regions include at least a first operation and identification region and a second operation and identification region. Therefore, different users may perform corresponding operations in different operation and identification regions. It is obvious for those skilled in the art that each of the operation and identification regions may have an independent desktop, application icon, application window and control.

When a first application is running on the electronic device, the electronic device may display the interactive program interface of the first application in the first operation and identification region. The first operation and identification region may be any one of the operation and identification regions of the display region of the display unit, or may be an operation and identification region indicated by a user's operation request.

When no other interactive program interface is displayed in the display region of the display unit of the electronic device, the interactive program interface of the first application may be displayed in the whole display region of the display unit.

Figure 3:
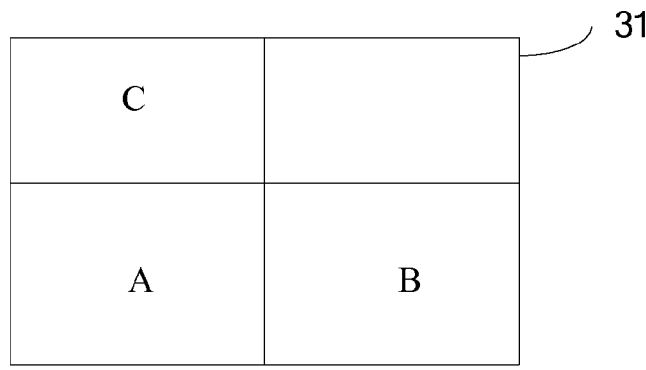
FIG. 3 is a schematic diagram of operation and identification regions included in the display region of the display unit according to the first embodiment of the present invention.

For example, as shown in FIG. 3, the display region 31 of the display unit includes four operation and identification regions, and for the electronic device, four users can perform corresponding operations in the different operation and identification regions simultaneously. The interactive program interface of the first application may be displayed in any one of the four operation and identification regions.

S202, receiving a first operation and generating a first instruction corresponding to the first operation by the display unit.

When the first application is running based on the first operating system and the interactive program interface of the first application is displayed in the first operation and identification region, the display unit of the electronic device receives the first operation of the user and generates the first instruction corresponding to the first operation according to the first operation.

For different devices, the first operation may be defined differently. The first operation intends to request the process unit to run a second application and display the interactive program interface of the second application in the second operation and identification region. Implementations of the first operation are not limited in the present invention.

For example, the touch gesture of the first operation may be: pressing the title bar or the interface of the first application of the first operation and identification region for a few seconds, and then sliding from the first operation and identification region to the second operation and identification region, for indicating the electronic device to display, in the second operation and identification region, the second application associated with the first application that is running in the first operation and identification region.

The first operation may also be performed in other manners, for example, dragging the first application by the mouse, or pressing the key on the keyboard.

S203, responding the first instruction and controlling a second application to run by the process unit, so that an interactive program interface of the second application is displayed in a second operation and identification region, the first application is the same as or is associated with the second application.

The second operation and identification region is any one of the operation and identification regions, except the first operation and identification region, in the display region of the display unit. Specifically, the second operation and identification region is a second operation and identification region indicated in the instruction.

The second application may be the same as the first application, or may be different from the first application, but the second application is associated with the first application.

Optionally, the second application is the same as the first application, and two or more first applications can run under the first operating system simultaneously, that is, the application which is usually referred to as "double-running" or "multiple-running" application. The process unit runs two first applications simultaneously, and at the same time the display unit displays the interactive program interfaces of the two first applications in different operation and identification regions respectively.

Optionally, the second application is the same as the first application, and two or more first applications cannot run under the first operating system simultaneously. The process unit responses the first instruction and controls the second application to run includes: starting a virtual machine unit and running the first application in the virtual machine unit.

For example, the first operating system is the ANDROID™ operating system, and the first application is the FRUIT NINJA™ game application. The ANDROID™ operating system cannot run two or more of the FRUIT NINJA™ game applications simultaneously. Therefore, the electronic device further includes a virtual machine unit. After receiving an operation of sliding from an operation and identification region A to an operation and identification region B perform by the user, the display unit generates an instruction of "running another instance of the FRUIT NINJA™ game application and displaying it in a display region corresponding to the operation and identification region B". The process unit responses the instruction and confirms that two or more of the FRUIT NINJA™ game applications cannot run under the same operating system. Then the process unit starts the virtual machine unit such as VMWARE™ virtualization software of the ANDROID™ operating system, and runs the FRUIT NINJA™ game application in the virtual machine unit. At the same time, the display unit displays the FRUIT NINJA™ game application that runs in the virtual machine unit in the operation and identification region B, and therefore, "clone" of the FRUIT NINJA™ game application from the region A to the region B is achieved.

Optionally, the operating system running in the virtual machine unit is the first operating system or a second operating system different from the first operating system.

Optionally, the first operation received by the display unit is an operation that is performed at least in the first operation and identification region and the second operation and identification region which is to display the interactive program interface of the second application.

For example, the first operation may be sliding from the first operation and identification region to the second operation and identification region. The first operation may also be gathering fingers together in the first operation and identification region and within a certain time, releasing fingers in the second operation and identification region. The first operation may also be pressing the left mouse button, shifting the mouse from the first operation and identification region to the second operation and identification region, and then releasing the left mouse button.

Based on the first operation of the first operation and identification region and the second operation and identification region, it is more easily for the process unit of the electronic device to quickly run the second application according to the instruction indicated by the first operation, and display the interactive program interface of the second application in the second operation and identification region.

Optionally, the first operation is a touch gesture, which is easy for the users to operate the electronic device.

Optionally, the first application is different from or the same as the second application. The first application and the second application are sub-applications of a third application. In this case, after responding the first instruction, controlling the second application to run and displaying the interactive program interface of the second application in the second operation and identification region, the process unit further displays interactive information of the first application and the second application in a third operation and identification region of the display unit.

For example, a user A1 plays the FRUIT NINJA™ game application in the operation and identification region A in an arcade mode, and the FRUIT NINJA™ game application of the arcade mode is a sub-application of the FRUIT NINJA™ game application main application. By a gesture operation, the FRUIT NINJA™ game application of the classic arcade mode is "cloned" to the operation and identification region B and provided to a user B1 for operation, or the FRUIT NINJA™ game application of the classic mode is started in the operation and identification region B for operating by B1. In such case, the process unit may record the game records of the users A1 and B1 at the same time and display the records in the operation and identification region C.

For example, a user A1 plays FRUIT NINJA™ game application in the operation and identification region A in a versus mode, and the FRUIT NINJA™ game application of the versus mode is a sub-application of the FRUIT NINJA™ game application main application. By a gesture operation, the FRUIT NINJA™ game application of the versus mode is "cloned" to the operation and identification region B and provided to a user B1 for operation. In such case, the process unit records the versus records and results of the users A1 and B1 and displays the records and results in the operation and identification region C.

Therefore, different applications may run on the same electronic device for different users, and interactive information of the multiple users may be recorded and displayed, which makes the electronic device more interesting and improves user experience.

Optionally, the second application is associated with the first application, the first application is a list application of multiple applications, and the second application is one of the multiple applications.

For example, the first application is an application of application list of the ANDROID™ operating system, such as the GOOGLE PLAY™ mobile application store, and the second application is one of the multiple applications in the first application, such as the first of the applications. Provided that the first application list includes the FRUIT NINJA™ game application, the ANGRY BIRDS™ game application, the PLANTS V. ZOMBIES™ game application, and the second application is the FRUIT NINJA™ game application. In this case, the touch gesture of the first operation may be: pressing the identification of the FRUIT NINJA™ game application displayed in the interface of the first application in the first operation and identification region for a few seconds, and then sliding from the first operation and identification region to the second operation and identification region, for indicating the electronic device to display, in the second operation and identification region, the second application associated with the first application that is running in the first operation and identification region. It is obvious for those skilled in the art that, the touch gesture of the first operation may also be pressing the identification of the ANGRY BIRDS™ game application displayed in the interface of the first application in the first operation and identification region for a few seconds, and then sliding from the first operation and identification region to the second operation and identification region, for indicating the electronic device to display, in the second operation and identification region, the ANGRY BIRDS™ game application associated with the first application that is running in the first operation and identification region.

For the display control method provided according to the first embodiment of the present invention, the electronic device includes a display unit and a process unit, the first operating system runs on the electronic device, the display region of the display unit includes at least two operation and identification regions, each of the operation and identification regions is a part of the display region and is adapted to promote the user to perform a touch operation in the operation and identification region. If the first application runs based on the first operating system and displayed in the first operation and identification region of the display unit, the display unit receives the first operation and generates a first instruction corresponding to the first operation, the process unit controls the second application to run according to the first instruction, and displays the interactive program interface of the second application in the second operation and identification region, the first application is associated with the second application. Therefore, the second application can be displayed in different operation and identification region of the electronic device as long as the user performs the first operation, which provides good user experience.

The Second Embodiment

Figure 4:
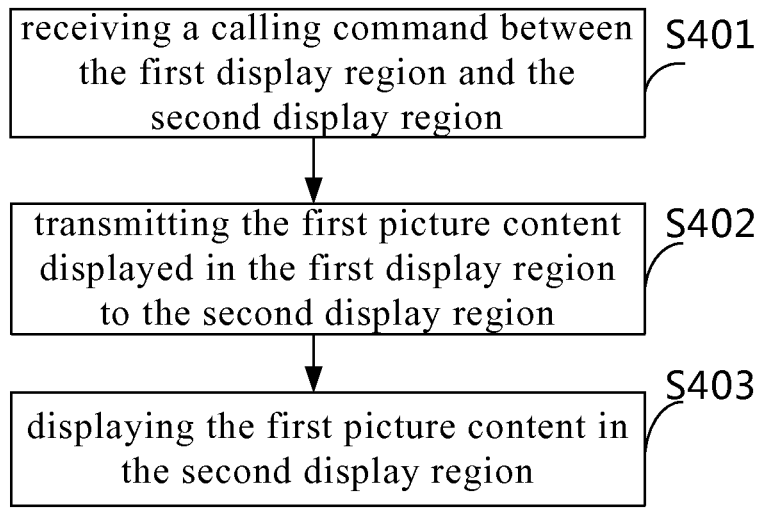
FIG. 4 is a flowchart of an interactive picture display control method according to a second embodiment of the present invention.

A method for interactive picture display control is provided according to the second embodiment of the present invention. The method is applied to an electronic device, the electronic device includes at least a first display region and a second display region, the first display region is adapted to display a first picture content, and the second display region is adapted to display a second picture content. As shown in FIG. 4, the method includes:

S401, receiving a calling command between the first display region and the second display region.

As an example, the electronic device, to which the multi-window interaction method for the electronic device according to the embodiment of the present invention is applied, is an existing large-scale touch device, or other large-scale non-touch device, it is not limited in the present invention.

If the electronic device is a large-scale touch device or other large-scale non-touch device, independent operations of multiple windows of one screen may be implemented by modularized operation. That is, the multiple windows may be regarded as two or more independent individuals. The difference is that the multiple windows of the electronic device are multiple windows of one screen, and the multiple windows are controlled by a same host.

If the electronic device is a large-scale touch device and the electronic device includes a first display region and a second display region, the electronic device may receive the calling command at any region of the first display region or the second display region of the electronic device; or receive the same calling commands at any regions of the first display region and the second display region of the electronic device; or receive the calling command at a particular position of the electronic device. The calling command may be received in other manners, and it is not limited in the present invention.

The calling command may be a calling command that is automatically parsed by the electronic device after a certain figure is inputted at a particular position or any position of the first display region; or may be a calling command that is automatically parsed by the electronic device after a certain figure is inputted at a particular position or any position of the second display region; or may be a calling command that is parsed by the electronic device after same figures are inputted at any regions of the first display region and the second display region of the electronic device; or may be a calling command that is parsed by the electronic device after a certain figure is inputted at a particular position of the electronic device. It should be noted that the calling command may be a calling command formed by other trigger manner, and it is not limited in the present invention.

Specifically, the inputted figure may be a letter such as "Z", "U", "Y", or may be a numeral such as "2", "3", or may be a pattern, or others, and it is not limited in the present invention.

Furthermore, the calling command may be a calling command inputted after a calling button is executed.

Specifically, a virtual calling button is preset at a certain region of the screen of the large-scale touch device, and if a calling among the multiple windows is needed to be performed, the user may implement the calling among the multiple windows by pressing the virtual calling button.

If the electronic device is other large-scale non-touch device, and this electronic device includes a first display region and a second display region, the calling command may be received at any region of the first display region or the second display region of the electronic device; or the same calling commands may be received at any regions of the first display region and the second display region of the electronic device; or the calling command may be received at a particular position of the electronic device.

The calling command may be a calling command inputted after the calling button is executed.

Specifically, a calling button is set at a certain position of the large-scale non-touch device, and if a calling among the multiple windows is needed to be performed, the user may implement the window calling between the first display region and the second display region by clicking the calling button.

It should be noted that the calling command may be a calling command of calling the first picture content displayed in the first display region by the second display region, or a calling command of calling the second picture content displayed in the second display region by the first display region.

Furthermore, the first display region and the second display region may call each other at the same time; and the second picture content is displayed in the first display region and the first picture content is displayed in the second display region.

S402, transmitting the first picture content displayed in the first display region to the second display region.

Specifically, after receiving the calling command of calling the first picture content displayed in the first display region by the second display region, the electronic device transmits the first picture content displayed in the first display region to the second display region.

Furthermore, after receiving the calling command between the first display region and the second display region, the electronic device transmits the second picture content displayed in the second display region to the first display region.

Specifically, after receiving the calling command of calling the second picture content displayed in the second display region by the first display region, the electronic device transmits the second picture content displayed in the second display region to the first display region.

It should be noted that the calling command may be a calling command of calling the first picture content displayed in the first display region by the second display region, or may be a calling command of calling the first picture content displayed in the first display region and control power of the first display content by the second display region.

Furthermore, the calling command may be a calling command of calling the second picture content displayed in the second display region by the first display region, or may be a calling command of calling the second picture content displayed in the second display region and control power of the second display content by the first display region.

Furthermore, after the calling command between the first display region and the second display region is received, the first picture content displayed in the first display region is transmitted to the second display region, and at the same time the control power of the first picture content is transferred from a first user to a second user.

Specifically, after receiving the calling command of calling the first picture content displayed in the first display region and the control power of the first display content by the second display region, the electronic device transmits the first picture content displayed in the first display region to the second display region, and at the same time transfers the control power of the first display content from the first user to the second user.

Furthermore, after the calling command between the first display region and the second display region is received, the second picture content displayed in the second display region is transmitted to the first display region, and at the same time the control power of the second display content is transferred from the second user to the first user.

Specifically, after receiving the calling command of calling the second picture content displayed in the second display region and the control power of the second display content by the first display region, the electronic device transmits the second picture content displayed in the second display region to the first display region, and at the same time transfers the control power of the second display content from the second user to the first user.

It should be noted that the first display content is adapted to be controlled by the first user and the second display content is adapted to be controlled by the second user.

Furthermore, after transferring the control power of the first display content from the first user to the second user, the method further includes switching the first display content and an application executing the display content to the second user.

Specifically, after receiving the calling command of calling the first picture content displayed in the first display region and the control power of the first display content by the second display region, the electronic device transmits the first picture content displayed in the first display region to the second display region, transfers the control power of the first display content from the first user to the second user, and switches the first display content and the application executing the display content to the second user.

Furthermore, after transferring the control power of the second display content from the second user to the first user, the method further includes: switching the second display content and an application executing the display content to the first user.

Specifically, after receiving the calling command of calling the second picture content displayed in the second display region and the control power of the second display content by the first display region, the electronic device transmits the second picture content displayed in the second display region to the first display region, transfers the control power of the second display content from the second user to the first user, and switches the second display content and the application executing the display content to the first user.

The first user is a user operating the first display region, and the second user is a user operating the second display region.

Specifically, in a case that the first picture content of the first display region is called by the second display region, if the first picture content is an image, the transmitted content is the content of the whole image, and if the first picture content is a video, the transmitted first picture content is the content of the whole video or a frame of the video at a certain time. The transmitted content is determined by the inputted calling command.

It should be noted that after the calling command is received at the first display region or the second display region, the transmitted first picture content or the second picture content may be the content in any other data forms. The transmitted content is depended on the specific content displayed in the first display region or the second display region at the calling time, and it is not limited in the present invention.

S403, displaying the first picture content in the second display region.

Specifically, after receiving the calling command of calling the first picture content displayed in the first display region by the second display region, the electronic device transmits the first picture content displayed in the first display region to the second display region, and displays the first picture content in the second display region.

Furthermore, after receiving the calling command of calling the second picture content displayed in the second display region by the first display region, the electronic device transmits the second picture content displayed in the second display region to the first display region, and displays the second picture content in the first display region.

Furthermore, after the first picture content is received by the second display region, the first picture content and also the second picture content are displayed in the second display region.

Furthermore, in a case that the first picture content and also the second picture content are displayed in the second display region, the received first picture content is displayed in foreground of the second display region, and the second picture content is displayed in background of the second display region.

It should be noted that after the second picture content is received by the first display region, the second picture content and also the first picture content are displayed in the second display region, the received second picture content is displayed in foreground of the first display region, and the first picture content is displayed in background of the first display region.

In the method for picture interactive display control according to the second embodiment of the present invention, when there are multiple windows on the electronic device, multiple users may need to interact with each other via the different windows. In this case, when receiving a calling command between the first display region and the second display region, the electronic device transmits the first picture content displayed in the first display region to the second display region and displays the first picture content and the second picture content in the second display region; or when receiving a calling command between the first display region and the second display region, the electronic device transmits the second picture content displayed in the second display region to the first display region and displays the second picture content and the first picture content in the first display region, to achieve interactive operation among multiple windows and improve user experience.

Figure 5:
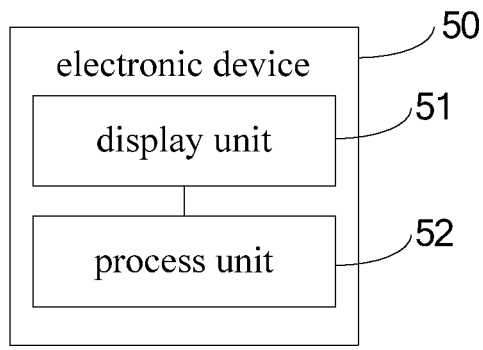
FIG. 5 is a schematic structure diagram of an electronic device according to the present invention.

Corresponding to the above method shown in FIG. 1, an electronic device is also provided according to the present invention. FIG. 5 is a schematic structure diagram of the electronic device. As shown in FIG. 5, the electronic device 50 includes a display unit 51 and a process unit 52. The display region of the display unit 51 includes at least a first display region and a second display region; the display unit 51 is adapted to receive a first operation and generate a first instruction corresponding to the first operation. The process unit 52 is adapted to response the first instruction and control the display region, to make the first display region and the second display region perform the interactive program display or the interactive picture display.

The Third Embodiment

Figure 6:
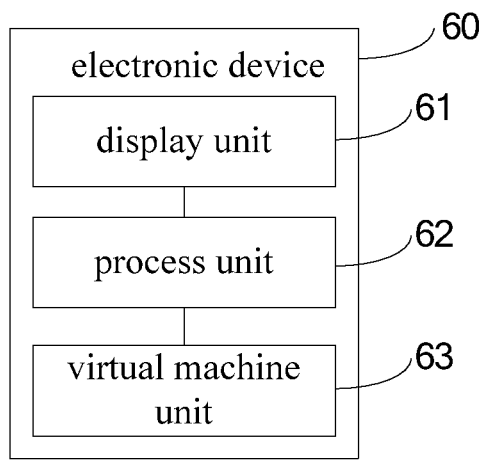
FIG. 6 is a schematic structure diagram of an electronic device for interactive program display control according to a third embodiment of the present invention.

An electronic device 60 for interactive program display control is provided according to the third embodiment of the present invention. The electronic device 60 corresponds to the method of the first embodiment. As shown in FIG. 6, the electronic device 60 includes a display unit 61 and a process unit 62.

The display region of the display unit 61 includes multiple operation and identification regions, each of the multiple operation and identification regions is a part of the display region and is adapted to promote a user to perform a touch operation on the operation and identification region, the multiple operation and identification regions include at least a first operation and identification region and a second operation and identification region.

Therefore, different uses may perform corresponding operations in different operation and identification regions.

The display unit 61 is adapted to display the interactive program interface of the first application in the first operation and identification region, and the first application runs based on the first operating system.

When the first application is running on the electronic device, the display unit 61 may display the interactive program interface of the first application in the first operation and identification region. The first operation and identification region may be any one of the operation and identification regions of the display region of the display unit 61, or may be a certain operation and identification region indicated by a user's operation request.

When no other interactive program interface is displayed in the display region of the display unit 61 of the electronic device, the interactive program interface of the first application may be displayed in the whole display region of the display unit 61.

For example, as shown in FIG. 3, the display region 31 of the display unit 61 includes four operation and identification regions, and thus for the electronic device, four uses may perform corresponding operations in the different operation and identification regions simultaneously. The interactive program interface of the first application may be displayed in any one of the four operation and identification regions, and if there is no other interactive program interface being displayed, the first application may also be displayed in the whole display region.

The display unit 61 is further adapted to receive a first operation and generate a first instruction corresponding to the first operation.

When the first application is running based on the first operating system and the interactive program interface of the first application is displayed in the first operation and identification region, the display unit 61 of the electronic device receives the user's first operation, and generates the first instruction corresponding to the first operation according to the first operation.

For different devices, the first operation may be defined differently. The first operation intends to request the process unit to run the second application, and display the interactive program interface of the second application in the second operation and identification region. The specific implementations of the first operation are not limited in the present invention.

For example, the touch gesture of the first operation may be: sliding from the first operation and identification region to the second operation and identification region for indicating the electronic device to display, in the second operation and identification region, the second application associated with the first application that is running in the first operation and identification region.

The second application may be the same as the first application, or may be different from the first application, but the first application is associated with the second application.

The process unit 62 is adapted to response the first instruction to control the second application to run, and indicate the display unit 61 to display the interactive program interface of the second application in the second operation and identification region, the first application is the same as or is associated with the second application.

The second operation and identification region is any one of the operation and identification regions, except the first operation and identification region, in the display region of the display unit 61. Specifically, the second operation and identification region is a second operation and identification region indicated in the instruction.

The display unit 62 is further adapted to display the interactive program interface of the second application in the second operation and identification region.

Optionally, the second application is the same as the first application, and multiple first applications can run under the first operating system simultaneously. The process unit 62 runs two first applications simultaneously, and at the same time the display unit 61 displays the interactive interfaces of the two first applications in different operation and identification regions respectively.

Optionally, the second application is the same as the first application, and multiple first applications cannot run under the first operating system simultaneously. The device further includes a virtual machine unit. The process unit is further adapted to start the virtual machine unit. The virtual machine unit is adapted to run the first application after receiving a starting instruction from the process unit.

For example, the first operating system is the ANDROID™ operating system, and the first application is the FRUIT NINJA™ game application. Two or more of the FRUIT NINJA™ game applications cannot run under the ANDROID™ operating system simultaneously. Therefore, the electronic device further includes a virtual machine unit 63. After receiving a user's operation of sliding from an operation and identification region A to an operation and identification region B, the display unit 61 generates an instruction of "running another instance of the FRUIT NINJA™ game application and displaying it in a display region corresponding to the operation and identification region B". The process unit 62 responses the instruction, confirms that the operating system cannot run two or more of the FRUIT NINJA™ game applications simultaneously, and starts the virtual machine unit 63. The virtual machine unit 63 runs the FRUIT NINJA™ game application and at the same time the display unit 61 displays the FRUIT NINJA™ game application running in the virtual machine unit 63 in the operation and identification region B.

Optionally, the operating system running in the virtual machine unit 63 is the first operating system or a second operating system different from the first operating system.

Specifically, the first operating system and the second operating system may be the ANDROID™ operating system or the WINDOWS 8™ operating system.

Optionally, the display unit 61 is adapted to receive a first operation which is based on at least the first operation and identification region and the second operation and identification region which is to display the interactive program interface of the second application.

For example, the first operation may be sliding from the first operation and identification region to the second operation and identification region. The first operation may also be gathering fingers together in the first operation and identification region, and within a certain time, releasing fingers in the second operation and identification region.

Based on the first operation of the first operation and identification region and the second operation and identification region, it is more easily for the process unit 62 of the electronic device to quickly run the second application according to the instruction indicated by the first operation, and instruct the display unit 61 to display the interactive program interface of the second application in the second operation and identification region. The first operation may also be pressing the left mouse button, shifting the mouse from the first operation and identification region to the second operation and identification region, and then releasing the left mouse button.

Optionally, as a touch gesture, the first operation is more easily to be performed by the user on the electronic device.

Optionally, the first application and the second application are sub-applications of a third application. The display unit 61 is further adapted to display interactive information of the first application and the second application in a third operation and identification region of the display region.

For example, if a user A1 is playing the FRUIT NINJA™ game application in the operation and identification region A in an arcade mode, and a user B1 is playing the FRUIT NINJA™ game application in the operation and identification region B in a classic mode, the process unit 32 records the play records of the users A1 and B1 at the same time and displays the records in the operation and identification region C.

Therefore, interactive information of different applications running on the same electronic device for different users is displayed and recorded, which improves the interaction of the electronic device and improves user experience.

Optionally, the second application is associated with the first application. The first application is a list application of multiple applications, and the second application is one of the multiple applications.

For the electronic device provided according to the third embodiment of the present invention, the electronic device includes a display unit and a process unit, the first operating system runs on the electronic device, the display region of the display unit includes at least two operation and identification regions, each of the operation and identification regions is a part of the display region and is adapted to promote a user to perform a touch operation on the operation and identification region. If the first application is running based on the first operating system and displayed in the first operation and identification region of the display unit, the display unit is adapted to receive the first operation and generate the first instruction corresponding to the first operation, the process unit is adapted to control the second application to run according to the first instruction and displays the interactive program interface of the second application in the second operation and identification region. The first application is associated with the second application, and therefore, the second application can be displayed in a different operation and identification region of the electronic device as long as the user performs the first operation, which provides good user experience.

The Fourth Embodiment

Figure 7:
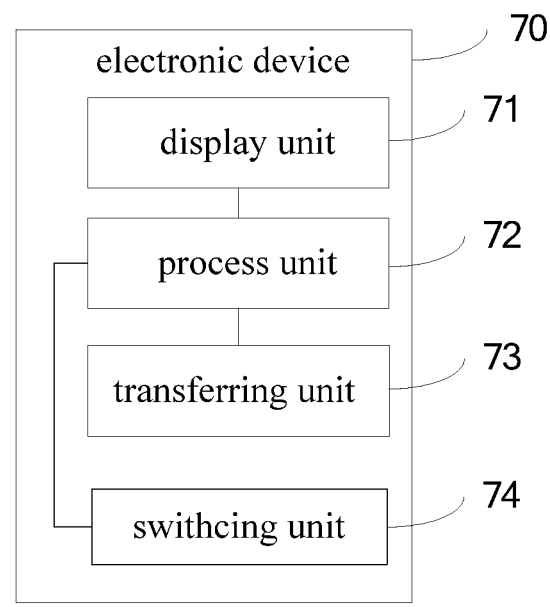
FIG. 7 is a schematic structure diagram of an electronic device for interactive picture display control according to a fourth embodiment of the present invention.

An electronic device for interactive picture display control is provided according to the fourth embodiment of the present invention, which corresponds to the second method embodiment. Referring to FIG. 7, each of the functional units of the electronic device 70 may be used to implement the above method steps. When the interactive picture display is performed, the first display region and the second display region included in the display region are the first display region and the second display region respectively, the first display region is adapted to display the first picture content, and the second display region is adapted to display the second picture content.

As shown in FIG. 7, the electronic device 70 includes a display unit 71 and a process unit 72. A first instruction corresponding to a first operation generated by the display unit 71 according to the received first operation is a calling command between the first display region and the second display region. The process unit 72 is adapted to transmit the first picture content displayed in the first display region to the second display region, and control the second display region to display the first picture content.

The process unit 72 is further adapted to transmit the second picture content displayed in the second display region to the first display region and display the second picture content in the first display region.

Preferably, the electronic device 70 further includes a transferring unit 73 which is adapted to transfer control power of the first display content from the first user to the second user. The transferring unit 73 is further adapted to transfer control power of the second display content from the second user to the first user.

Preferably, the electronic device 70 further includes a switching unit 74 which is adapted to switch the first display content and an application executing the display content to the second user. The switching unit 74 is further adapted to switch the second display content and an application executing the display content to the first user.

Furthermore, the calling command is received at any region of the first display region or the second display region of the electronic device 70; or the same calling commands are received at any regions of the first display region and the second display region of the electronic device 70.

Figure 8:
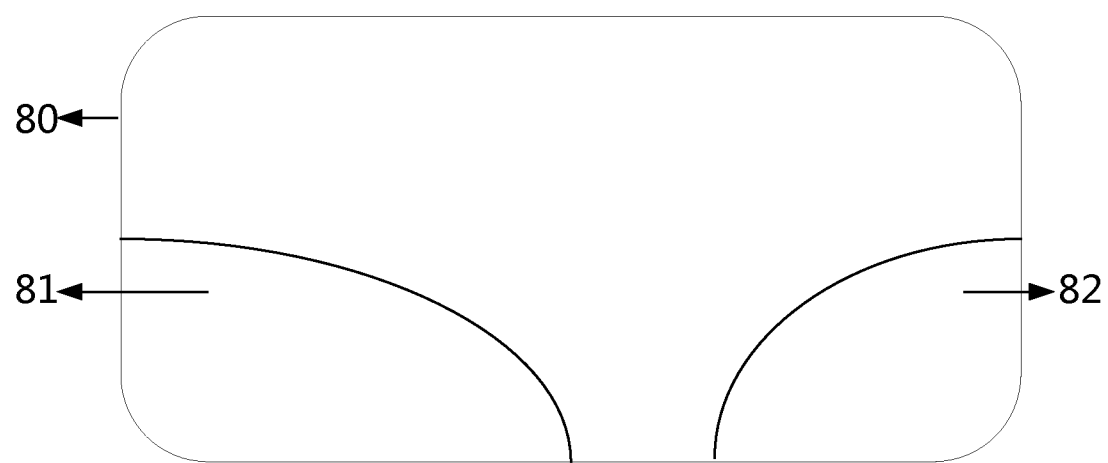
FIG. 8 is a schematic diagram of the electronic device for interactive picture display control according to the fourth embodiment of the present invention.

Referring to FIG. 8, in an actual electronic device 80, there are two windows, i.e., a first display region 81 and a second display region 82 on the display screen of the electronic device 80.

Figure 9:
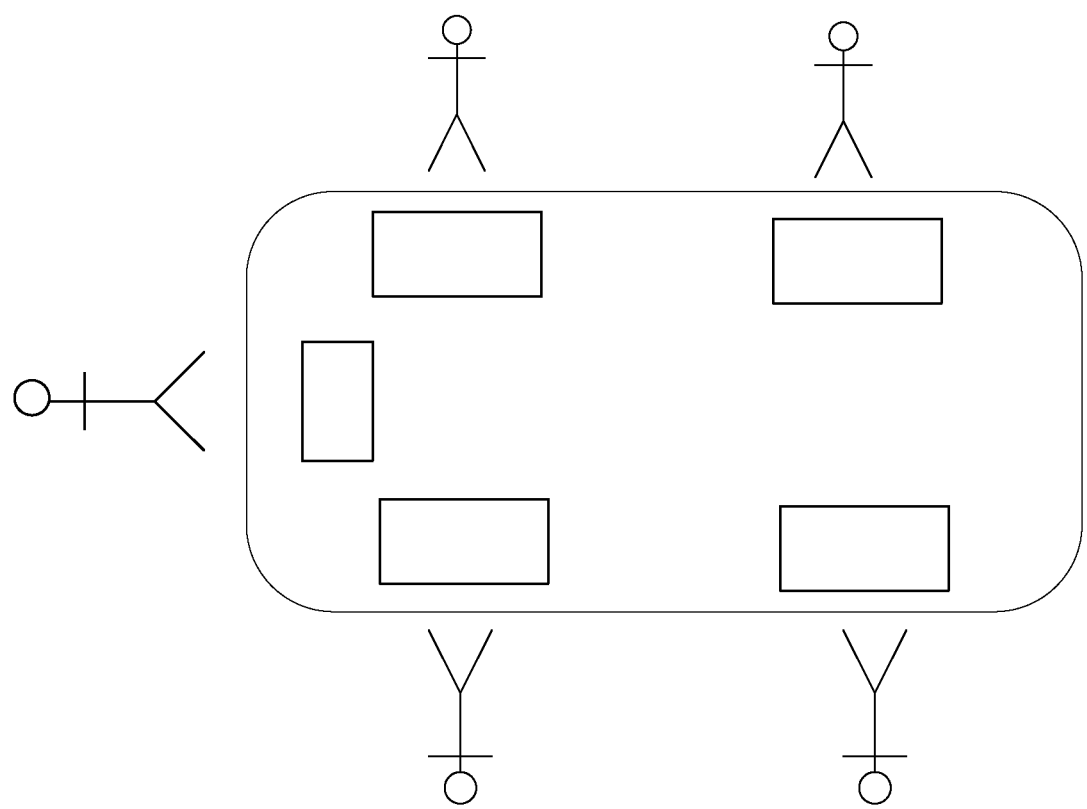
FIG. 9 is a schematic diagram of a large-scale touch electronic device according to the fourth embodiment of the present invention.

As an example, the embodiment of the present invention may also be applied to multiple people meeting in real life. As shown in FIG. 9, in a large-scale touch electronic device, the electronic device may be a large-scale touch conference table and there are at least five users around the large-scale touch conference table. Provided that the first user is at left side of the touch conference table, and the other four users are at two sides of the touch conference table, in this case, when the other four users need to read a first display content of the first user, the other four users input the same calling commands to the touch conference table, and the touch conference table transmits the first display content of the first user to the other four users after receiving the calling commands of the other four users, so that the other four users can view the first display content of the first user. If the first display content is a questionnaire, the other four users may fill the questionnaire correspondingly after receiving the questionnaire. If the first user wants to view the questionnaires filled by the other four users, the first user inputs a calling command to the touch conference table, and the touch conference table transmits the questionnaires filled by the other four users to the first user after receiving the calling command of the first user, so that the first user may view the questionnaires filled by the other four users. Therefore, quick interactions among the users are achieved.

As an example, the embodiment of the present invention may also be applied to the following scenes: for a large-scale touch device, if a first user is playing a game and needs the second user's help, the first user may inputs a calling command to the large-scale touch device, and the large-scale touch device transmits the game application of the first user to the second user. The second user helps the first user to process the application and transmits the display content to the first user after finishing the process. Therefore, the users may help each other without changing their positions.

In the electronic device for interactive picture display according to the fourth embodiment of the present invention, if there are multiple windows on the device, multiple users may interact with each other via the different windows. In this case, when receiving the calling command between the first display region and the second display region, the electronic device transmits the first picture content displayed in the first display region to the second display region, and displays the first picture content and the second picture content in the second display region; or when receiving the calling command between the first display region and the second display region, the electronic device transmits the second picture content displayed in the second display region to the first display region, and displays the second picture content and the first picture content in the first display region, to achieve interactive operations among multiple windows and improve user experience.

Those skilled in the art can understand that all or part of steps for achieving the above method embodiment can be implemented by hardware associated with program instructions. The above-mentioned program may be stored in a computer readable storage medium, and the steps of the above method embodiment are performed when the program is executed. The above-mentioned storage medium includes any medium which can store program codes, such as ROM, RAM, magnetic disk or optical disk.

The above are only specific embodiments of the invention, and the protection scope of the invention is not limited thereto. Any variation or substitution which can be easily conceived by those skilled in the art within the technical scope disclosed by the invention should fall within the protection scope of the invention. Therefore, the protection scope of the invention should be based on protection scope of the claims.

The invention claimed is:

1. A display control method for an electronic device, which is applied to the electronic device comprising a display unit and a process unit, a display region of the display unit including at least a first display region, a second display region, and a third display region, the method comprising:
 displaying an interactive program interface of a first application in the first display region;
 receiving a first operation and generating a first instruction corresponding to the first operation by the display unit, wherein the first operation is performed from the first display region to the second display region;
 responding to the first instruction, controlling a second application to run by the process unit and displaying an interactive program interface of the second application in the second display region, wherein the first application and the second application are sub-applications of a third application; and
 displaying interactive information of the first application and the second application in the third display region, wherein the interactive information is generated in a process of interaction between the first application and the second application.

2. The method according to claim 1, wherein:
 the first display region and the second display region are a first operation and identification region and a second operation and identification region respectively,
 the first operation and identification region and the second operation and identification region are part of the display region and are adapted to promote a user to perform a touch operation on the operation and identification region, and
 the application is the same as or is associated with the second application.

3. The method according to claim 2, wherein in a case that the second application is the same as the first application, a plurality of first applications are able to run on a first operating system simultaneously.

4. The method according to claim 2, wherein:
 in a case that the second application is the same as the first application, a plurality of first applications are unable to run on a first operating system simultaneously,
 responding to the first instruction and controlling the second application to run by the process unit comprises: starting a virtual machine processor and running the first application on the virtual machine processor, wherein an operating system running on the virtual machine processor is the first operating system or a second operating system different from the first operating system.

5. An electronic device, comprising a display unit and a process unit, wherein
 a display region of the display unit comprises at least a first display region, a second display region, and a third display region; the electronic device comprises a processor executing an operating system wherein the processor executes a computer program comprising:

the display unit is adapted to display an interactive program interface of a first application in the first display region, and receive a first operation and generate a first instruction corresponding to the first operation;

the process unit is adapted to respond to the first instruction, control a second application to run, wherein the first application and the second application are sub-applications of a third application;

the process unit is adapted to generate interactive information of the first application and the second application in a process of interaction between the first application and the second application; and the display unit is further adapted to display an interactive program interface of the second application in the second display region, and display the interactive information of the first application and the second application in the third display region.

6. The electronic device according to claim 5, wherein:

a first operating system runs on the electronic device, the first display region and the second display region included in the display region are a first operation and identification region and a second operation and identification region respectively, the first operation and identification region and the second operation and identification region are part of the display region and are adapted to promote a user to perform a touch operation on the operation and identification region, and the first application is the same as or is associated with the second application.

7. The electronic device according to claim 6, wherein in a case that the second application is the same as the first application, a plurality of first applications are able to run on a same operating system simultaneously.

8. The electronic device according to claim 6, wherein in a case that the second application is the same as the first application, a plurality of first applications are unable to run on a same operating system simultaneously, and the device further comprises a virtual machine processor, wherein when the processor executes the computer program, the process unit starts the virtual machine processor; and the virtual machine processor runs the first application after receiving a starting instruction from the process unit, wherein an operating system running on the virtual machine processor is the first operating system or a second operating system different from the first operating system.

* * * * *